US008422984B2

United States Patent
Chin et al.

(10) Patent No.: US 8,422,984 B2
(45) Date of Patent: Apr. 16, 2013

(54) METHODS AND SYSTEMS FOR CONFIGURATION AND ACTIVATION OF POWER SAVING CLASSES BY A MOBILE STATION IN A SLEEP MODE

(75) Inventors: Tom Chin, San Diego, CA (US); Kuo-Chun Lee, San Diego, CA (US)

(73) Assignee: QUALCOMM Incorporated, San Diego ( * ) Notice: Subject to any disclaimer, the term of this patent is extended or adjusted under 35 U.S.C. 154(b) by 767 days.

(21) Appl. No.: 12/124,970

(22) Filed: May 21, 2008

(65) Prior Publication Data

US 2009/0197528 A1   Aug. 6, 2009

Related U.S. Application Data

(60) Provisional application No. 61/025,497, filed on Feb. 1, 2008.

(51) Int. Cl.
*H04B 1/16* (2006.01)
*G08C 17/00* (2006.01)

(52) U.S. Cl.
USPC ............... 455/343.4; 455/343.1; 455/574; 370/311

(58) Field of Classification Search ........ 455/574, 455/231, 343.1, 343.4; 370/280, 311
See application file for complete search history.

(56) References Cited

U.S. PATENT DOCUMENTS

| 7,564,810 | B2 | 7/2009 | Hernandez et al. |
| 7,787,406 | B2 * | 8/2010 | Park et al. .......... 370/311 |
| 7,826,459 | B2 * | 11/2010 | Xhafa et al. ........ 370/395.5 |
| 7,991,436 | B2 * | 8/2011 | Yanover .............. 455/574 |
| 8,095,106 | B2 * | 1/2012 | Kone et al. .......... 455/343.1 |
| 8,204,555 | B2 * | 6/2012 | Yanover .............. 455/574 |
| 2007/0274247 | A1 * | 11/2007 | Chou ................. 370/315 |
| 2008/0072086 | A1 * | 3/2008 | Kim .................. 713/323 |
| 2008/0107047 | A1 * | 5/2008 | Olfat ................. 370/280 |
| 2008/0107056 | A1 * | 5/2008 | Choi et al. ......... 370/311 |
| 2008/0139212 | A1 * | 6/2008 | Chen et al. ......... 455/450 |
| 2008/0182567 | A1 * | 7/2008 | Zhu et al. .......... 455/418 |
| 2009/0135755 | A1 * | 5/2009 | Qi et al. ............ 370/311 |
| 2009/0209223 | A1 * | 8/2009 | Kone et al. ......... 455/343.1 |
| 2009/0312073 | A1 * | 12/2009 | Park et al. .......... 455/574 |
| 2010/0062725 | A1 * | 3/2010 | Ryu et al. .......... 455/69 |

FOREIGN PATENT DOCUMENTS

| CN | 1716878 A | 1/2006 |
| EP | 1608191 A2 | 12/2005 |
| JP | 2008517515 A | 5/2008 |
| JP | 2008541600 A | 11/2008 |
| RU | 2313123 C2 | 12/2007 |
| WO | WO9507594 A1 | 3/1995 |
| WO | WO2006040769 | 4/2006 |

OTHER PUBLICATIONS

International Search Report PCT/US09/032666, International Search Authority European Patent Office Jun. 5, 2009.
Written Opinion—PCT/US09/032666, International Search Authority, European Patent Office, Jun. 5, 2009.
Taiwan Search Report—TW098103322—TIPO—Jul. 12, 2012.

* cited by examiner

*Primary Examiner* — Duc M Nguyen
(74) *Attorney, Agent, or Firm* — Charles Chesney

(57) ABSTRACT

Techniques presented herein allow connections with different (albeit possibly similar) scheduling or data delivery services to be aggregated (or "bundled") into groups, with each group assigned a common Power Savings Class Type. Bundling different connections into common PSC types may reduce the overall number of different sleep windows for active connections, which may help reduce overall power consumption. For example, by automatically activating different PSC types (for different bundles of connections), the reduced number of sleep windows may overlap in a manner that results in the MS spending more overall time in a low power state than when conventional "unbundled" PSC schemes are utilized.

34 Claims, 8 Drawing Sheets

US 8,422,984 B2

METHODS AND SYSTEMS FOR CONFIGURATION AND ACTIVATION OF POWER SAVING CLASSES BY A MOBILE STATION IN A SLEEP MODE

CROSS-REFERENCE TO RELATED APPLICATIONS

The present application claims the benefit of U.S. Provisional Application Ser. No. 61/025,497, filed Feb. 1, 2008, herein incorporated by reference in its entirety.

TECHNICAL FIELD

Certain embodiments of the present disclosure generally relate to wireless communication and, more particularly, to the configuration and activation of power saving classes by a mobile station (MS) in a sleep mode.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

In an effort to conserve power at the MS, the IEEE 802.16 standard defines power savings class (PSC) modes, where the MS may power down one or more components during sleep windows. The MS periodically wakes up to monitor for activity during listening windows to decide whether the PSC mode should be exited. The MS may enter PSC modes separately for different connections with the same base station. Unfortunately, however, the MS must power up components during the listening window for each connection. Because the listening window for one connection may overlap with the sleep window for another connection, power savings is not optimal.

Accordingly, what is needed is an improved technique for conserving power in an MS.

SUMMARY

Certain embodiments provide a method for entering a power savings mode in a wireless mobile station exchanging data with a base station (BS). The method generally includes identifying connections established for exchanging data between the mobile station and the base station, wherein at least two of the connections exchange data according to different types of scheduling services, aggregating at least two of the connections into one or more groups, each group having a common power savings class (PSC) type, and activating the corresponding one or more common PSC types in response to detecting inactivity on each connection of one or more of the groups for a predetermined period of time.

Certain embodiments provide a mobile station. The mobile station generally includes logic for identifying connections established for exchanging data between the mobile station and a base station, wherein at least two of the connections exchange data according to different types of scheduling services, logic for aggregating at least two of the connections into one or more groups, each group having a common power savings class (PSC) type, and logic for activating the corresponding one or more common PSC types in response to detecting inactivity on each connection of one or more of the groups for a predetermined period of time.

Certain embodiments provide an apparatus. The apparatus generally includes means for identifying connections established for exchanging data between the apparatus and a base station, wherein at least two of the connections exchange data according to different types of scheduling services, means for aggregating at least two of the connections into one or more groups, each group having a common power savings class (PSC) type, and means for activating the corresponding one or more common PSC types in response to detecting inactivity on each connection of one or more of the groups for a predetermined period of time.

Certain embodiments provide a computer-readable medium containing instructions for a program for entering a power savings mode in a wireless mobile station exchanging data with a base station (BS). When executed by a processor, the program performs operations generally including identifying connections established for exchanging data between the mobile station and the base station, wherein at least two of the connections exchange data according to different types of scheduling services, aggregating at least two of the connections into one or more groups, each group having a common power savings class (PSC) type, and activating the corresponding one or more common PSC types in response to detecting inactivity on each connection of one or more of the groups for a predetermined period of time.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
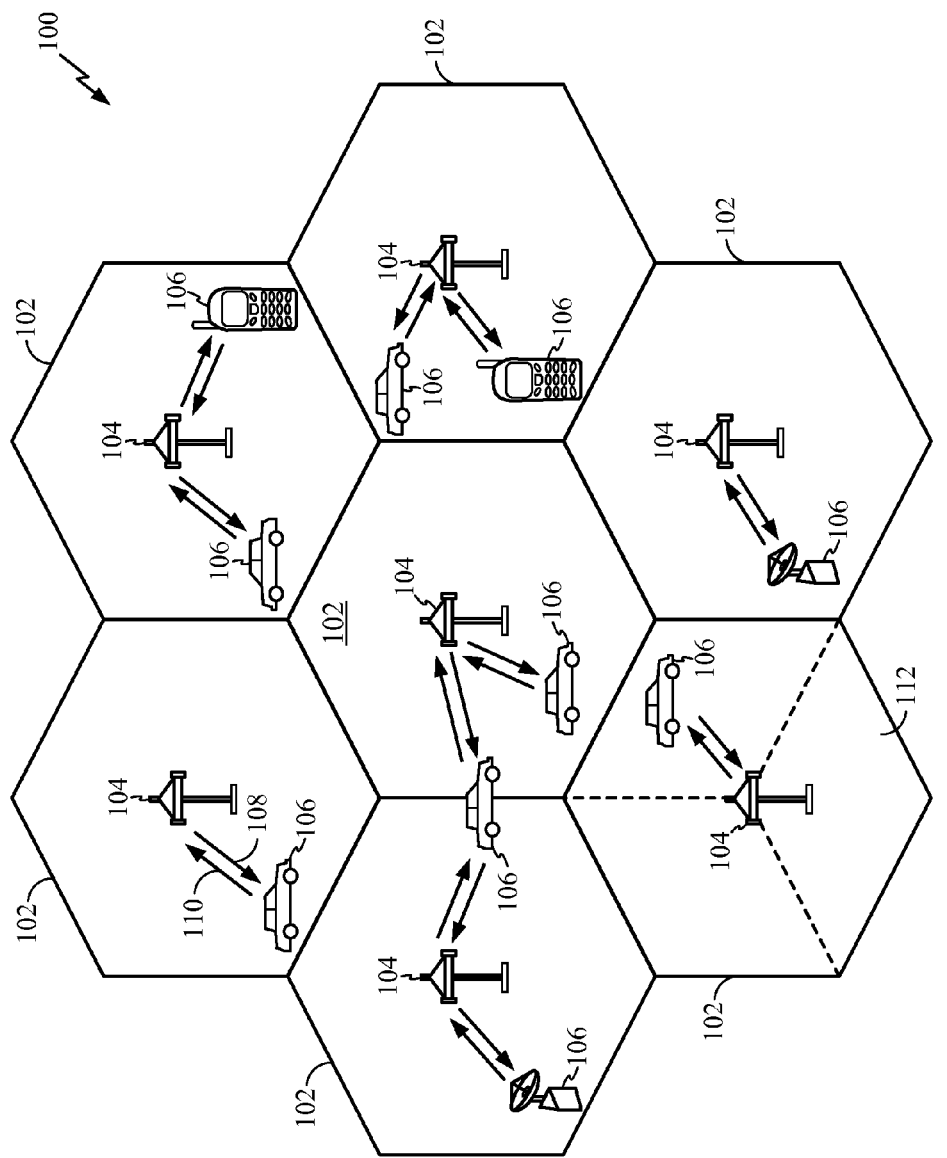
FIG. 1 illustrates an example wireless communication system, in accordance with certain embodiments of the present disclosure.

Embodiments of the present disclosure allow a MS to aggregate active connections having similar scheduling or data delivery types to a common PSC type. For some embodiments, two or more PSC types may be simultaneously activated resulting in improved alignment between the sleep windows and listening windows of multiple active connections. By aggregating active connections having similar scheduling types to a common PSC type, the MS may enter PSC sleep windows more frequently and remain in said sleep windows for longer periods of time, thus saving power and extending the time in which the MS may operate between chargings.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present invention may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
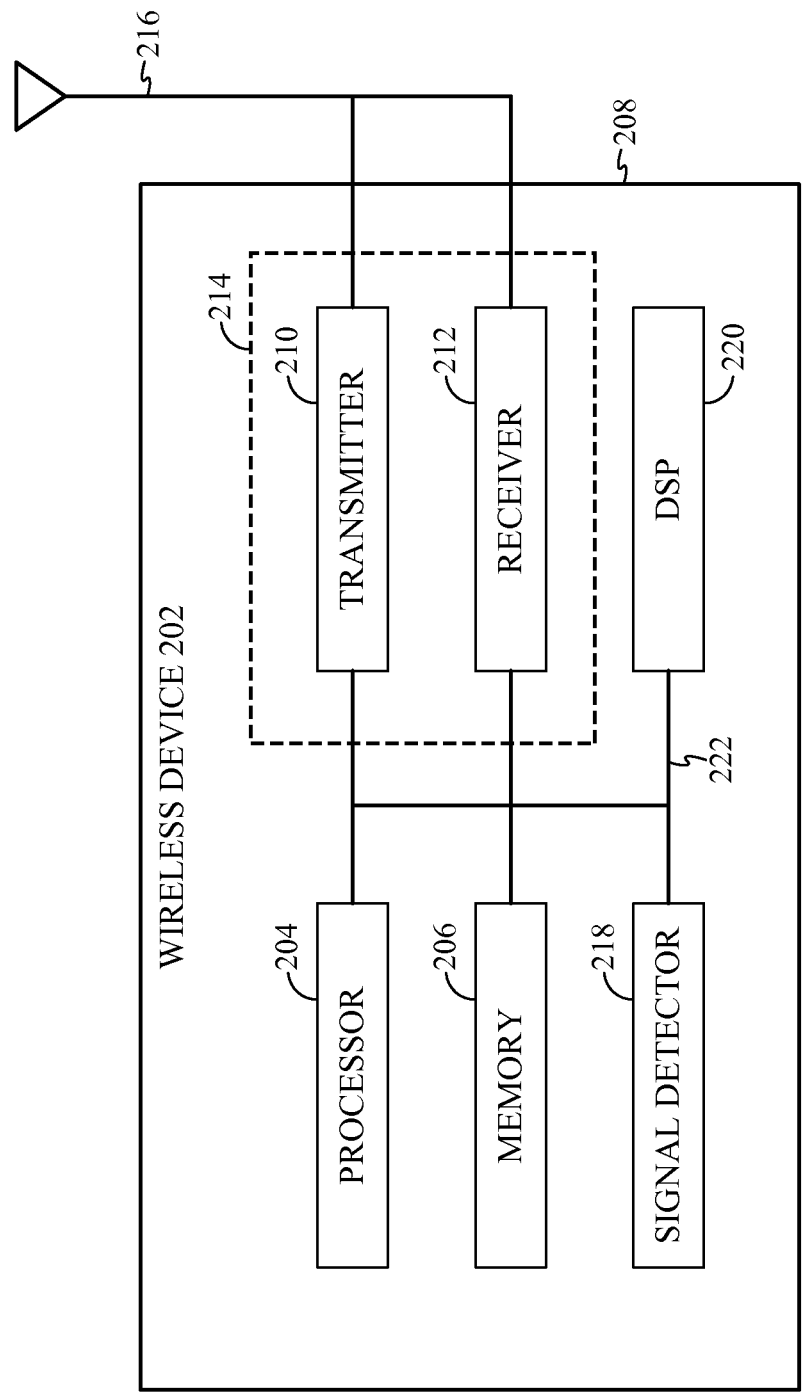
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). Processor 204 can performs logical and arithmetic operations based on program instructions stored within memory 206. The instructions in memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
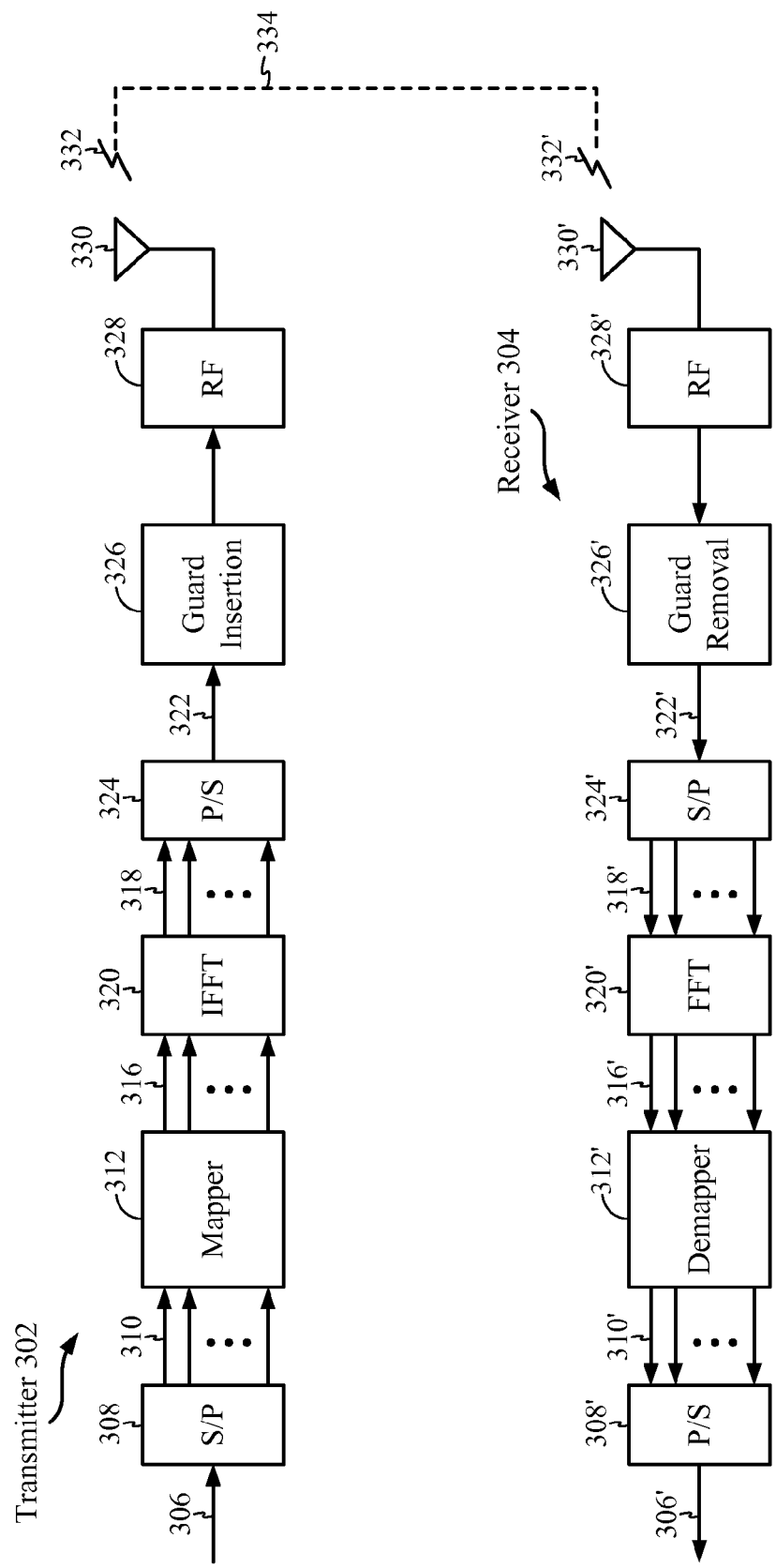
FIG. 3 illustrates an example transmitter and an example receiver that may be used within a wireless communication system that utilizes orthogonal frequency-division multiplexing and orthogonal frequency division multiple access (OFDM/A) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. Transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Configuration and Activation of Power Savings Class (PSC) Types

Support for different types of Quality of Service (QoS), for applications with different data delivery needs, is a fundamental part of the WiMAX standard. Strong QoS support may be achieved by using a connection-oriented MAC architecture. To facilitate QoS control, before any data transmission happens, the BS and the MS establish a unidirectional logical link, generally referred to as a connection, between the two MAC-layer peers. In some instances, a MS and a BS may establish several connections at any given time. Each connection may be identified by a connection identifier (CID), which serves as a temporary address for data transmissions over the particular link.

To support a wide variety of applications with different data delivery needs, the WiMAX standard defines a variety of different scheduling or data delivery services that should be supported by a BS's MAC scheduler for data transport over a connection. These scheduling or data delivery services include unsolicited grant service (UGS), real-time variable rate (RT-VR), extended real-time variable rate (ERT-VR), non-real-time variable rate (NRT-VR), and best effort (BE). As each connection between a BS and a MS is individually identifiable with the use of the CID, each connection may be, to some degree, independent from all other connections between said BS and MS and different connections may have different scheduling services.

Techniques presented herein allow connections with different (albeit possibly similar) scheduling services to be aggregated (or "bundled") into groups, with each group assigned a common Power Savings Class Type. Bundling different connections into common PSC types may reduce the overall number of different sleep windows for active connections, which may help reduce overall power consumption. For example, by automatically activating different PSC types (for different bundles of connections), the reduced number of sleep windows may overlap in a manner that results in the MS spending more overall time in a low power state than when conventional "unbundled" PSC schemes are utilized.

Bundling connections as presented herein may also result in fewer overall PSC Types when compared to conventional PSC schemes. As a result, the proposed PSC techniques may reduce processing complexity at a serving base station (BS) by reducing the total number of power saving classes the BS needs to support.

Figure 4:
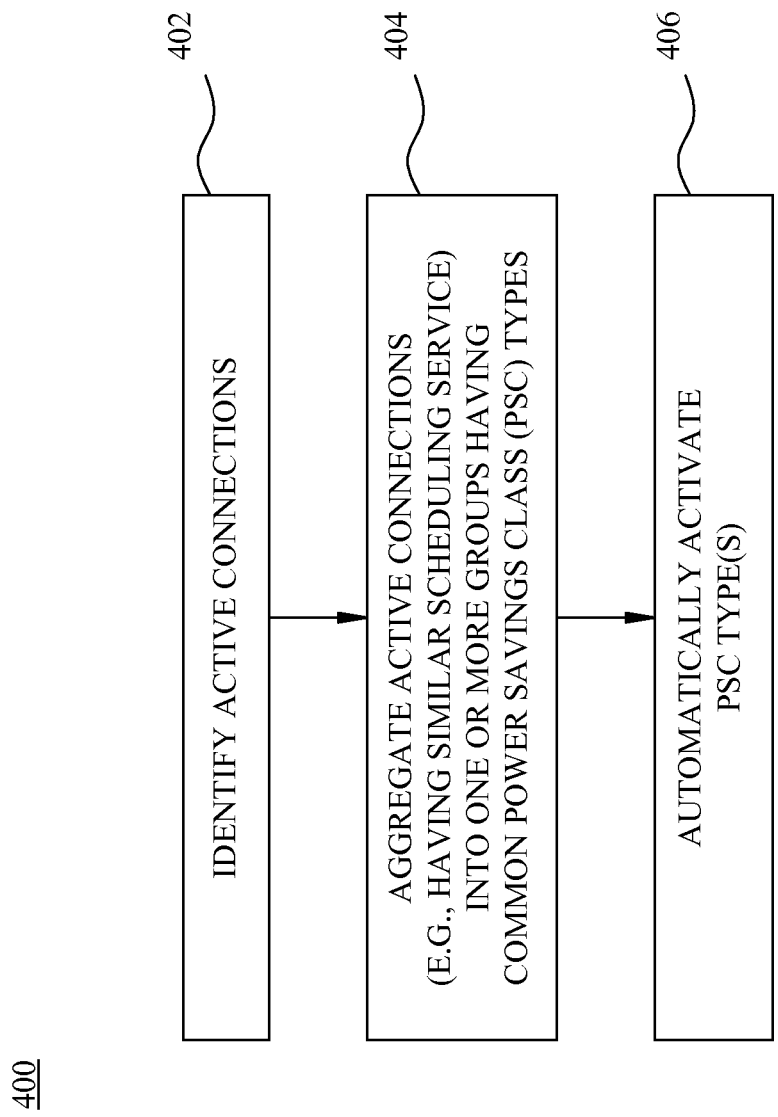
FIG. 4 illustrates example operations for bundling connections and activating corresponding power savings class (PSC) types, in accordance with embodiments of the present disclosure.

Referring to FIG. 4, example operations 400 for configuring and activating power savings class (PSC) Types in accordance with certain embodiments of the present disclosure. The operations 400 begin, at 402, by identifying active connections.

At 404, active connections are aggregated into one or more groups having common PSC Types. For some embodiments, active connections with similar scheduling services may be aggregated into common groups. For example, connections that have more relaxed data delivery requirements, such as NRT-VR and BE service, may grouped together and assigned a first PSC Type. This PSC Type may allow for more aggressive low power states, for example, with fixed length listening windows and exponentially increasing sleep windows. Connections with more demanding data delivery requirements, such as UGS, RT-VR, and ERT-VR, may be assigned a second PSC Type, for example, with sleep windows of fixed duration.

At 406, PSC Types may be automatically activated. For example, a PSC Type may be automatically activated if there has been no activity (e.g., no data transmitted or received) on any of the corresponding aggregated connections for a predetermined amount of time. For certain embodiments, multiple PSC Types may be activated together (e.g., simultaneously). For example, assuming two bundled groups of connections with two PSC Types I and II, both PSC Types may be automatically activated if no activity has been detected on any of the corresponding connections.

While multiple connections may be bundled in a group, in certain situations, there may be only a single connection in one or more of the PSC groups. In other words, a PSC group may include one or more different types of connections. For example, in a situation where there is a single UGS connection (and no RT-VR or ERT-VR connections) and a single NRT-VR connection (and no BE connections), there may still be two PSC groups, which may be activated concurrently. A first (more aggressive) PSC group may be used for the one NRT-VR connection, while a second (less aggressive) PSC group may be used for the one UGS connection.

Figure 5:
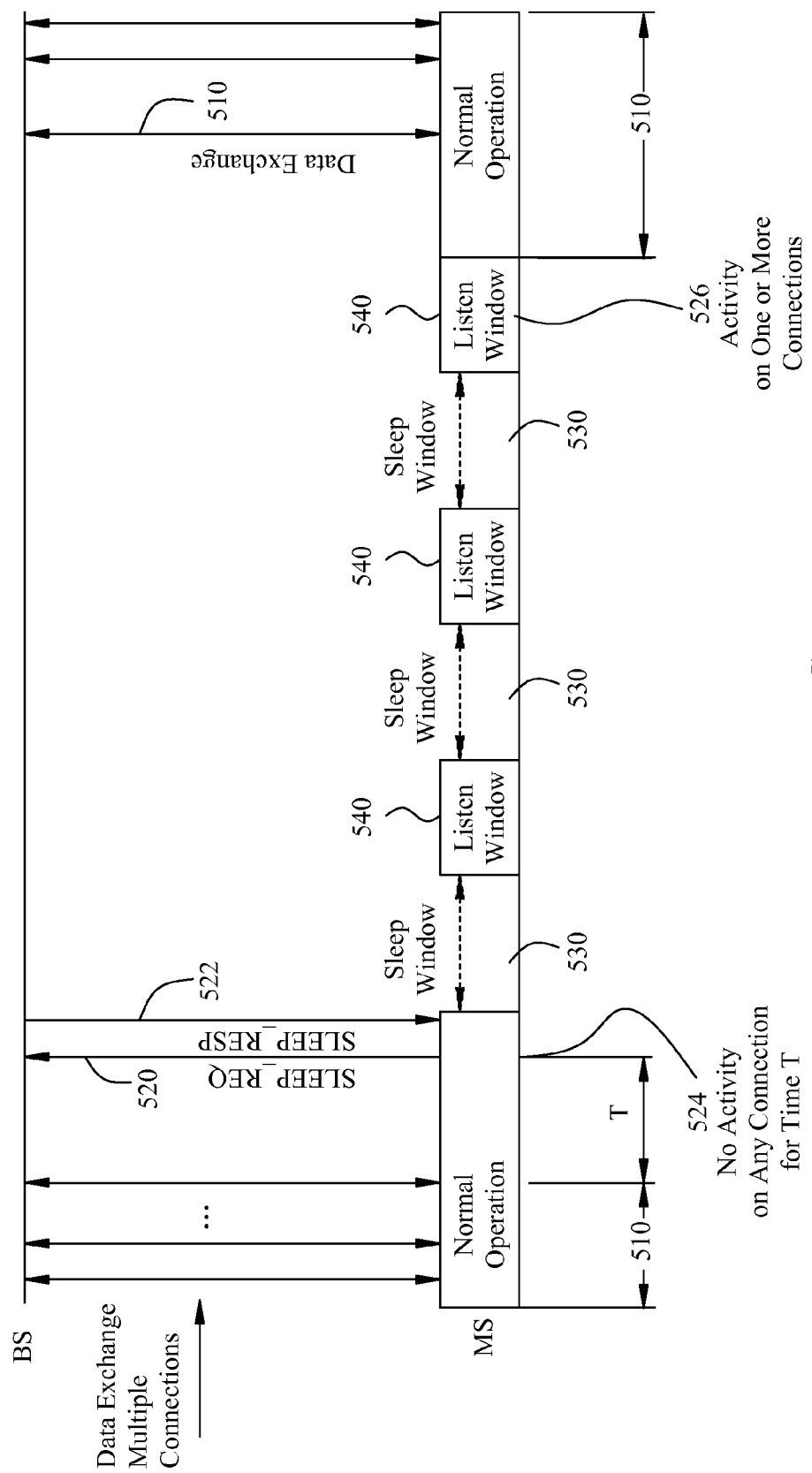
FIG. 5 illustrates example exchanges between a BS and a MS, in accordance with embodiments of the present disclosure.

FIG. 5 illustrates an example exchange that may occur between a BS and a MS entering a PSC sleep mode, according to embodiments of the present disclosure. The exchange begins with a period of "normal operation" 510 with active data exchanges over multiple connections. The multiple connections may be bundled to one or more PSC Type, as described above.

After a period (T) of inactivity on all connections, at 524, the MS may automatically activate one or more of the PSC Types for bundled connections. As illustrated, to activate a PSC Type, the MS may send a sleep request 520 to the BS. Upon receiving a Sleep Response 522, the MS may enter into a low power state for a sleep window 530, which may be fixed or exponentially increasing, depending on the activated PSC type. As illustrated, between sleep windows 530, the MS may awaken during listening windows 540 to "listen" for activity (data received or transmitted) that might prompt an exit (de-activation) of the PSC Type.

In the example illustrated in FIG. 5, activity is detected in a listening window 540. In response, the MS may deactivate the one or more active PSC Types, and return to normal operations 510 and resume data exchanges on one or more of the connections. While not shown in FIG. 5, conventional power savings schemes may activate PSC Types on a connection by connection basis.

Figure 6A:
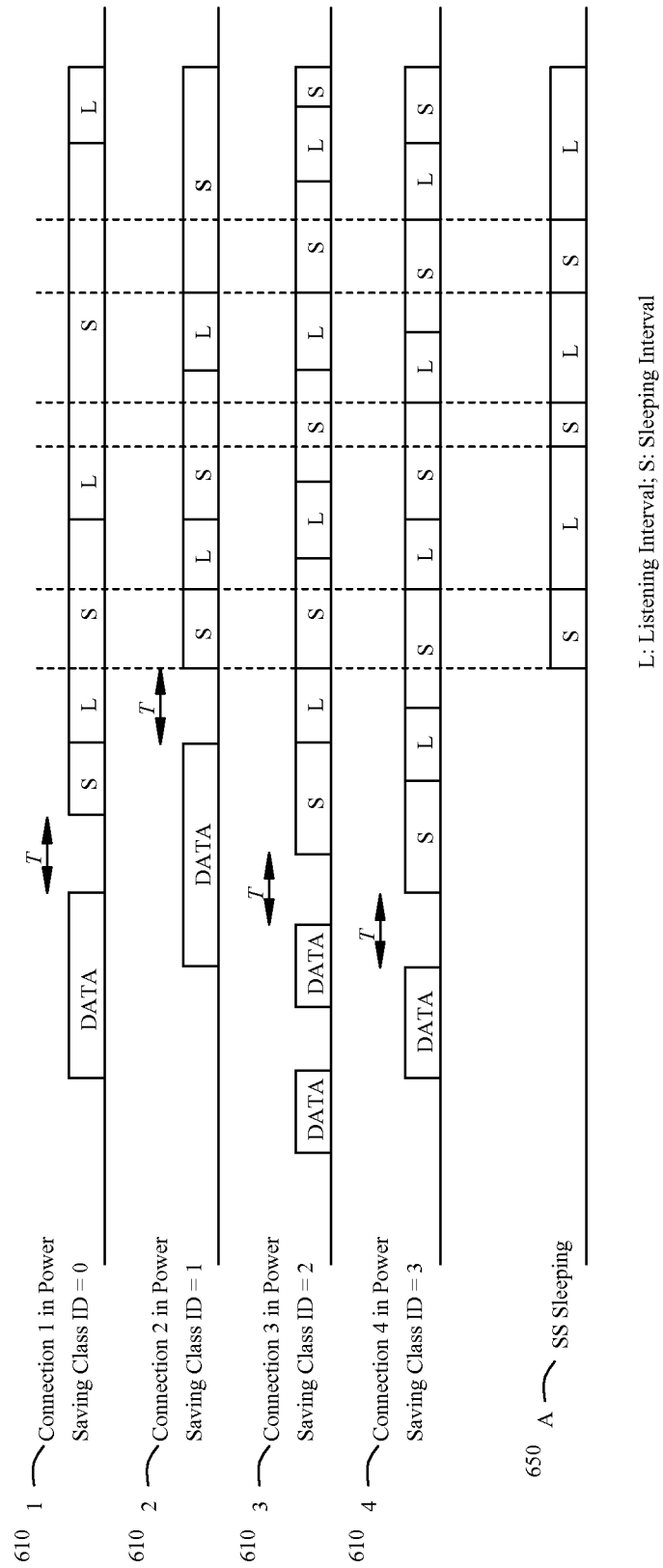
FIGS. 6A & 6B illustrate example sleep mode timing diagrams for a MS, in accordance with embodiments of the present disclosure.

For example, as illustrated in FIG. 6A, conventional schemes may activate a PSC Type for a given connection when there is no activity detected on that connection for a predetermined period of time. The illustrated example shows diagrams for four connections $610_1$-$610_4$, each assigned a different PSC Types (with Class IDs 0-3). Unfortunately, such a scheme may result in a large number of sleep and listening windows and the MS must power on components for each listening window.

This overall effect on the MS is illustrated by the diagram $650_A$ at the bottom, in this scheme, the MS will wake up and listen during the Listening Window for each PSC Type. As a result, the listening windows for each PSC Type are basically aggregated (e.g., logically OR'd) into an effectively longer listening window, while the sleep windows for each PSC Type are reduced (logically AND'd). The overall effect is less than optimal power savings, as components are only powered down in the limited times when the sleep windows overlap as indicated by the dashed lines.

Figure 6B:
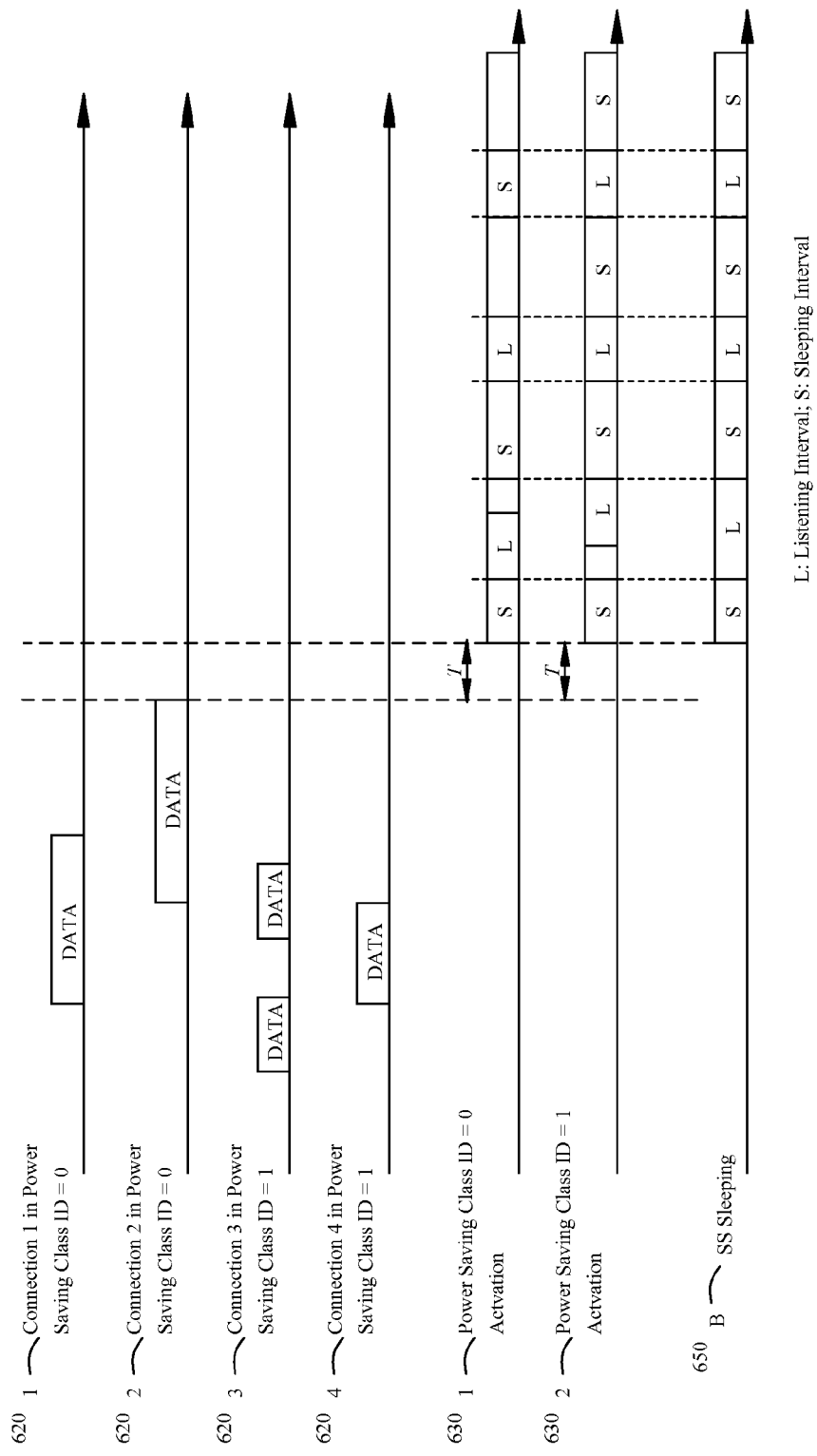

As illustrated in FIG. 6B, however, bundling the connections as presented herein may result in fewer sleep windows and more overlap, resulting in increased power savings as the MS is able to power components down a greater percentage of the time. The example illustrated in FIG. 6B also assumes four connections and the same data transmissions (shown on diagrams $620_1$-$620_4$) as shown in FIG. 6A. Connections 1 and 2 are bundled into groups assigned a first PSC Type (Class ID 0), while Connections 3 and 4 are bundled into a group assigned a second PSC Type (Class ID 1).

The timing of these PSC Types is shown in diagrams $630_1$ and $630_2$. Rather than activate the PSC types on a connection by connection basis, the PSC Types may be activated together after a predetermined period of inactivity (T) on all corresponding connections. Diagrams $630_1$ and $630_2$ show sleep windows of the first PSC Type (Class ID 0) and the second PSC Type (Class ID 1) that are at least initially aligned in accordance with various embodiments. As a result of the fewer number of sleep and listening windows, the MS may spend a greater percentage of time with components powered down. For example, as illustrated in diagram $650_B$, bundling the connections may result in substantially more overlap between sleep windows, as indicated by the dashed lines.

The example of FIG. 6B demonstrates the activation of multiple PSC Types, each having a corresponding set of bundled connections. However, those skilled in the art will also recognize that bundling of multiple connections into a group having a common PSC Type may result in significant power savings even if a single PSC Type is activated. For example, if all active connections of an MS are bundled in a common group, activating the PSC Type for that group in response to detecting inactivity on all corresponding bundled connections will still reduce the number of sleep and time windows when compared to the connection by connection activation illustrated in FIG. 6A. In other words, the MS will not have to wake up for the listening windows of each connection and may, therefore, stay in a sleep mode with components powered down for a greater percentage of time.

As previously described, in addition to reducing power consumption at the MS, bundling connections as presented herein may also reduce BS complexity. For example, by using fewer overall PSC Types when compared to conventional PSC schemes, processing complexity at a serving base station (BS) by reducing the total number of power saving classes the BS needs to support.

Figure 4A:
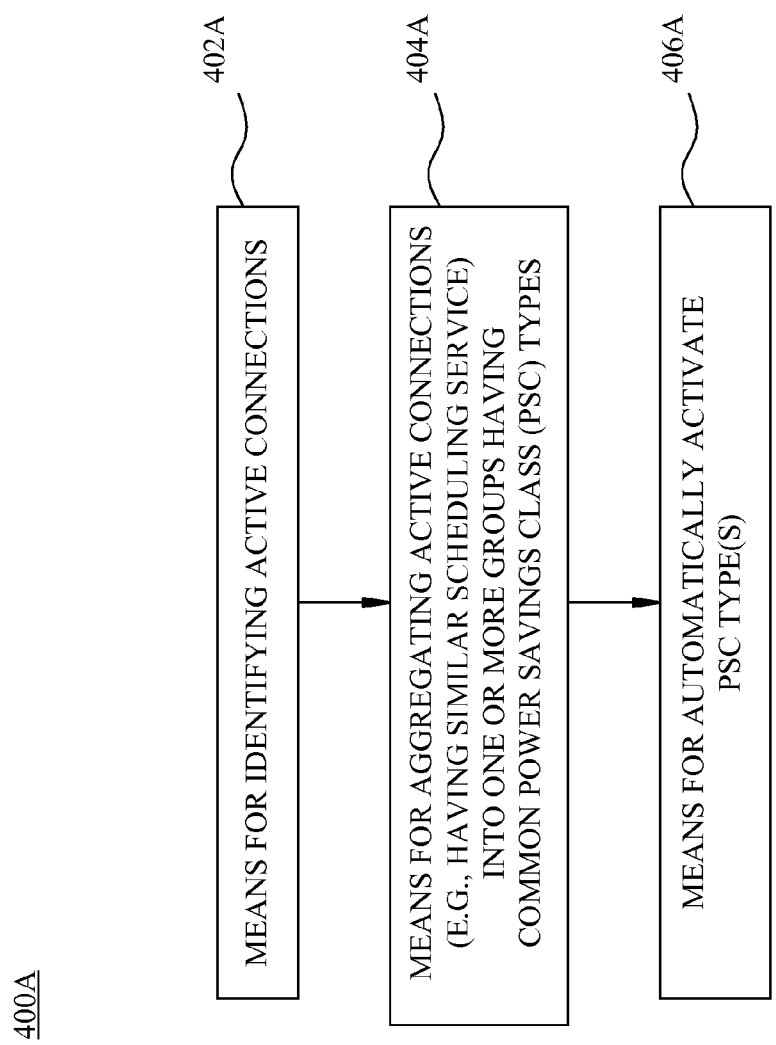
FIG. 4A is a block diagram of components capable of performing the example operations of FIG. 4.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 402-406 illustrated in FIG. 4 correspond to means-plus-function blocks 402A-406A illustrated in FIG. 4A.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as instructions or one or more sets of instructions on a computer-readable medium or storage medium. A storage media may be any available media that can be accessed by a computer or one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for entering a power savings mode in a wireless mobile station exchanging data with a base station (BS), comprising:
   identifying a plurality of connections established for exchanging data between the mobile station and the base station, wherein at least two of the connections exchange data according to different types of scheduling services;
   aggregating at least two of the connections that exchange data according to different types of scheduling services into one or more groups, each group having a common power savings class (PSC) type and at least two of the connections that exchange data according to the different scheduling services, and wherein at least two of the aggregated connections in one of the groups have sleep windows with different durations; and
   activating the corresponding one or more common PSC types for each of the at least two aggregated connections of the corresponding one or more groups in response to detecting inactivity on each of the at least two aggregated connections that exchange data according to the different scheduling services of one or more of the groups for a predetermined period of time, the activation timed to align the sleep windows of each of the at least two aggregated connections within each group.

2. The method of claim 1, wherein aggregating at least two of the connections into one or more groups comprises:
   aggregating a first set of connections having different types of scheduling or data delivery services in a first group having a first common PSC type; and
   aggregating a second set of connections having different types of scheduling or data delivery services to a second group having a common PSC type.

3. The method of claim 2, wherein:
   the first group comprises at least one connection using a best effort (BE) type of service and at least one connection using a non real time variable rate (NRT-VR).

4. The method of claim 2, wherein the second group comprises at least one connection using an unsolicited grant service (UGS) type of service and at least one connection using a real time variable rate (RT-VR) or extended real time variable rate (ERT-VR) type of service.

5. The method of claim 2, wherein:
   the first common PSC type defines fixed duration sleep windows separated by fixed duration listening windows; and the second common PSC type defines exponentially increasing sleep windows separated by fixed duration listening windows.

6. The method of claim 5, wherein activating the corresponding one or more common PSC types in response to detecting inactivity on each connection of one or more of the groups for a predetermined period of time comprises:
activating the first and second common PSC types in response to detecting inactivity on each connection of the first and second groups for a predetermined period of time.

7. The method of claim 6, wherein:
the mobile station powers down one or more components when sleep windows of the first and second common PSC Types overlap; and
the first and second common PSC Types are activated in a manner such that the sleep windows of the first and second common PSC Type are at least initially aligned.

8. The method of claim 1, wherein:
the base station and mobile station communicate using frames in accordance with one or more standards of the Institute of Electrical and Electronics Engineers (IEEE) 802.16 family of standards; and
aggregating at least two of the connections into one or more groups comprises aggregating at least two of the connections into one or more groups, each group having a common PSC type in accordance with the IEEE 802.16 family of standards.

9. The method of claim 1, wherein the sleep windows of at least a subset of the aggregated connections become unaligned over time.

10. A mobile station, comprising:
logic for identifying a plurality of connections established for exchanging data between the mobile station and a base station, wherein at least two of the connections exchange data according to different types of scheduling services;
logic for aggregating at least two of the connections that exchange data according to different types of scheduling services into one or more groups, each group having a common power savings class (PSC) type and at least two of the connections that exchange data according to the different scheduling services, and wherein at least two of the aggregated connections in one of the groups have sleep windows with different durations; and
logic for activating the corresponding one or more common PSC types for each of the at least two aggregated connections of the corresponding one or more groups in response to detecting inactivity on each of the at least two aggregated connections that exchange data according to the different scheduling services of one or more of the groups for a predetermined period of time, the activation timed to align the sleep windows of each of the at least two aggregated connections within each group.

11. The mobile station of claim 10, wherein the logic for aggregating at least two of the connections into one or more groups is configured to:
aggregate a first set of connections having different types of scheduling or data delivery services in a first group having a first common PSC type; and
aggregate a second set of connections having different types of scheduling or data delivery services to a second group having a common PSC type.

12. The mobile station of claim 11, wherein:
the first group comprises at least one connection using a best effort (BE) type of service and at least one connection using a non real time variable rate (NRT-VR).

13. The mobile station of claim 11, wherein the second group comprises at least one connection using an unsolicited grant service (UGS) type of service and at least one connection using a real time variable rate (RT-VR) or extended real time variable rate (ERT-VR) type of service.

14. The mobile station of claim 11, wherein:
the first common PSC type defines fixed duration sleep windows separated by fixed duration listening windows; and
the second common PSC type defines exponentially increasing sleep windows separated by fixed duration listening windows.

15. The mobile station of claim 14, wherein the logic for activating the corresponding one or more common PSC types in response to detecting inactivity on each connection of one or more of the groups for a predetermined period of time is configured to:
activate the first and second common PSC types in response to detecting inactivity on each connection of the first and second groups for a predetermined period of time.

16. The mobile station of claim 15, wherein:
the mobile station powers down one or more components when sleep windows of the first and second common PSC Types overlap; and
the first and second common PSC Types are activated in a manner such that the sleep windows of the first and second common PSC Type are at least initially aligned.

17. The mobile station of claim 11, wherein the sleep windows of at least a subset of the aggregated connections become unaligned over time.

18. The mobile station of claim 10, wherein:
the base station and mobile station communicate using frames in accordance with one or more standards of the Institute of Electrical and Electronics Engineers (IEEE) 802.16 family of standards; and
the logic for aggregating at least two of the connections into one or more groups is configured to aggregate at least two of the connections into one or more groups, each group having a common PSC type in accordance with the IEEE 802.16 family of standards.

19. An apparatus, comprising:
means for identifying a plurality of connections established for exchanging data between the apparatus and a base station, wherein at least two of the connections exchange data according to different types of scheduling services;
means for aggregating at least two of the connections that exchange data according to different types of scheduling services into one or more groups, each group having a common power savings class (PSC) type and at least two of the connections that exchange data according to the different scheduling services, and wherein at least two of the aggregated connections in one of the groups have sleep windows with different durations; and
means for activating the corresponding one or more common PSC types for each of the at least two aggregated connections of the corresponding one or more groups in response to detecting inactivity on each of the at least two aggregated connections that exchange data according to the different scheduling services of one or more of the groups for a predetermined period of time, the activation timed to align the sleep windows of each of the at least two aggregated connections within each group.

20. The apparatus of claim 19, wherein the means for aggregating at least two of the connections into one or more groups is configured to:

aggregate a first set of connections having different types of scheduling or data delivery services in a first group having a first common PSC type; and aggregate a second set of connections having different types of scheduling or data delivery services to a second group having a common PSC type.

21. The apparatus of claim 20, wherein:
the first group comprises at least one connection using a best effort (BE) type of service and at least one connection using a non real time variable rate (NRT-VR).

22. The apparatus of claim 20, wherein the second group comprises at least one connection using an unsolicited grant service (UGS) type of service and at least one connection using a real time variable rate (RT-VR) or extended real time variable rate (ERT-VR) type of service.

23. The apparatus of claim 20, wherein:
the first common PSC type defines fixed duration sleep windows separated by fixed duration listening windows; and
the second common PSC type defines exponentially increasing sleep windows separated by fixed duration listening windows.

24. The apparatus of claim 23, wherein the means for activating the corresponding one or more common PSC types in response to detecting inactivity on each connection of one or more of the groups for a predetermined period of time is configured to:
activate the first and second common PSC types in response to detecting inactivity on each connection of the first and second groups for a predetermined period of time.

25. The apparatus of claim 24, wherein:
the apparatus powers down one or more components when sleep windows of the first and second common PSC Types overlap; and
the first and second common PSC Types are activated in a manner such that the sleep windows of the first and second common PSC Type are at least initially aligned.

26. The apparatus of claim 19, wherein:
the base station and apparatus communicate using frames in accordance with one or more standards of the Institute of Electrical and Electronics Engineers (IEEE) 802.16 family of standards; and
the means for aggregating at least two of the connections into one or more groups is configured to aggregate at least two of the connections into one or more groups, each group having a common PSC type in accordance with the IEEE 802.16 family of standards.

27. A tangible computer-readable medium containing instructions for a program for entering a power savings mode in a wireless mobile station exchanging data with a base station (BS) which, when executed by a processor, performs operations comprising:
identifying a plurality of connections established for exchanging data between the mobile station and the base station, wherein at least two of the connections exchange data according to different types of scheduling services;
aggregating at least two of the connections that exchange data according to different types of scheduling services into one or more groups, each group having a common power savings class (PSC) type and at least two of the connections that exchange data according to the different scheduling services, and wherein at least two of the aggregated connections in one of the groups have sleep windows with different durations; and
activating the corresponding one or more common PSC types for each of the at least two aggregated connections of the corresponding one or more groups in response to detecting inactivity on each of the at least two aggregated connections that exchange data according to the different scheduling services of one or more of the groups for a predetermined period of time, the activation timed to align the sleep windows of each of the at least two aggregated connections within each group.

28. The computer-readable medium of claim 27, wherein aggregating at least two of the connections into one or more groups comprises:
aggregating a first set of connections having different types of scheduling or data delivery services in a first group having a first common PSC type; and
aggregating a second set of connections having different types of scheduling or data delivery services to a second group having a common PSC type.

29. The computer-readable medium of claim 28, wherein:
the first group comprises at least one connection using a best effort (BE) type of service and at least one connection using a non real time variable rate (NRT-VR).

30. The computer-readable medium of claim 28, wherein the second group comprises at least one connection using an unsolicited grant service (UGS) type of service and at least one connection using a real time variable rate (RT-VR) or extended real time variable rate (ERT-VR) type of service.

31. The computer-readable medium of claim 28, wherein:
the first common PSC type defines fixed duration sleep windows separated by fixed duration listening windows; and
the second common PSC type defines exponentially increasing sleep windows separated by fixed duration listening windows.

32. The computer-readable medium of claim 31, wherein activating the corresponding one or more common PSC types in response to detecting inactivity on each connection of one or more of the groups for a predetermined period of time comprises:
activating the first and second common PSC types in response to detecting inactivity on each connection of the first and second groups for a predetermined period of time.

33. The computer-readable medium of claim 32, wherein:
the mobile station powers down one or more components when sleep windows of the first and second common PSC Types overlap; and
the first and second common PSC Types are activated in a manner such that the sleep windows of the first and second common PSC Type are at least initially aligned.

34. The computer-readable medium of claim 27, wherein:
the base station and mobile station communicate using frames in accordance with one or more standards of the Institute of Electrical and Electronics Engineers (IEEE) 802.16 family of standards; and
aggregating at least two of the connections into one or more groups comprises aggregating at least two of the connections into one or more groups, each group having a common PSC type in accordance with the IEEE 802.16 family of standards.

* * * * *